US011834031B2

(12) United States Patent
Hoshi et al.

(10) Patent No.: US 11,834,031 B2
(45) Date of Patent: Dec. 5, 2023

(54) VEHICLE CONTROL SYSTEM

(71) Applicant: SUBARU CORPORATION, Tokyo (JP)

(72) Inventors: Takumi Hoshi, Tokyo (JP); Fumiyuki Moriya, Tokyo (JP); Tatsuhiro Kubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 217 days.

(21) Appl. No.: 17/383,539

(22) Filed: Jul. 23, 2021

(65) Prior Publication Data

US 2022/0041154 A1 Feb. 10, 2022

(30) Foreign Application Priority Data

Aug. 6, 2020 (JP) .................................. 2020-134161

(51) Int. Cl.
*B60W 20/11* (2016.01)
*B60W 10/06* (2006.01)
(Continued)

(52) U.S. Cl.
CPC ............ *B60W 20/11* (2016.01); *B60W 10/06* (2013.01); *B60W 10/08* (2013.01);
(Continued)

(58) Field of Classification Search
CPC ...... B60W 20/11; B60W 20/13; B60W 20/15; B60W 10/06; B60W 10/08; B60W 10/188;
(Continued)

(56) References Cited

U.S. PATENT DOCUMENTS

2010/0131168 A1  5/2010  Maruyama
2017/0174202 A1  6/2017  Sasaki et al.

FOREIGN PATENT DOCUMENTS

DE   112011103235 B4 *  7/2019  ............ B60T 13/662
JP       4296991 B2 *  7/2009  ............ B60L 11/123
(Continued)

OTHER PUBLICATIONS

Machine Translation of JP4296991B2 PDF File Name: "JP4296991B2_Machine_Translation.pdf".*

(Continued)

*Primary Examiner* — Jacob M Amick
*Assistant Examiner* — Ruben Picon-Feliciano
(74) *Attorney, Agent, or Firm* — TROUTMAN PEPPER HAMILTON SANDERS LLP

(57) ABSTRACT

A vehicle control system includes a target drive force calculation unit, an arithmetic unit, a stop holding unit, a power-running-generative drive force calculation unit, and a traveling mode selection unit. The arithmetic unit calculates required drive force and required brake force based on target drive force calculated by the target drive force calculation unit. The arithmetic unit calculates the required drive force by setting the required brake force to stop hold brake force or greater if an engine traveling mode is selected at an immediately preceding timing by the traveling mode selection unit. The arithmetic unit calculates the required brake force by setting the required drive force to less than or equal to power-running-generative drive force calculated by the power-running-generative drive force calculation unit if an electric vehicle traveling mode is selected at the immediately preceding timing by the traveling mode selection unit.

15 Claims, 9 Drawing Sheets

(51) Int. Cl.
  *B60W 10/08* (2006.01)
  *B60W 10/26* (2006.01)
  *B60W 20/15* (2016.01)
  *B60W 10/188* (2012.01)
  *B60W 20/13* (2016.01)
(52) U.S. Cl.
  CPC .......... *B60W 10/188* (2013.01); *B60W 10/26* (2013.01); *B60W 20/13* (2016.01); *B60W 20/15* (2016.01); *B60W 2510/087* (2013.01); *B60W 2510/244* (2013.01); *B60W 2510/246* (2013.01); *B60W 2710/18* (2013.01)
(58) Field of Classification Search
  CPC ........... B60W 10/26; B60W 2510/087; B60W 2510/244; B60W 2510/246; B60W 2710/18
  See application file for complete search history.

(56) References Cited

FOREIGN PATENT DOCUMENTS

| | | |
|---|---|---|
| JP | 2010-120601 A | 6/2010 |
| JP | 2017-118663 A | 6/2017 |

OTHER PUBLICATIONS

Machine Translation of DE112011103235B4 PDF File Name: "DE112011103235B4_Machine_Translation.pdf".*

* cited by examiner

VEHICLE CONTROL SYSTEM

CROSS-REFERENCE TO RELATED APPLICATIONS

The present application claims priority from Japanese Patent Application No. 2020-134161 filed on Aug. 6, 2020, the entire contents of which are hereby incorporated by reference.

BACKGROUND

The technology relates to a vehicle control system for a vehicle with a vehicle hold function that holds the vehicle in a stopped state. For example, the technology relates to a technical field of brake fluid pressure control performed immediately before the vehicle is stopped.

A vehicle with a vehicle hold function has been known. With the vehicle hold function, the vehicle is held in a stopped state. Such a vehicle hold function is used when the vehicle following a preceding vehicle at a controlled speed under adaptive cruise control (ACC) makes a stop, or when the vehicle is stopped on the basis of a one-pedal operation, for example. The one-pedal operation refers to an operation that accelerates or decelerates the vehicle on the basis of an operation of a single pedal.

Due to some restrictions on a mechanism that holds brake fluid pressure, the vehicle hold function sometimes requires higher brake fluid pressure than that required to stop the vehicle. In such a case, the brake fluid pressure at the stop of the vehicle needs to be boosted to a brake fluid pressure enough to enable the vehicle hold function.

Reference is made to Japanese Unexamined Patent Application Publication (JP-A) Nos. 2010-120601 and 2017-118663.

SUMMARY

An aspect of the technology provides a vehicle control system configured to control a vehicle including an engine and a motor as drive sources. The motor is configured to be driven by electric power supplied from a battery. The vehicle control system includes a target drive force calculation unit, an arithmetic unit, a stop holding unit, a power-running-generative drive force calculation unit, and a traveling mode selection unit. The target drive force calculation unit is configured to calculate target drive force of the vehicle. The arithmetic unit is configured to calculate required drive force and required brake force on the basis of the target drive force. The required drive force is used to control driving of the engine and the motor. The required brake force is used to control hydraulic brake. In a case where stop-timing brake force corresponding to the required brake force at a vehicle stop timing is not greater than or equal to stop hold brake force required to hold the vehicle in a stopped state, the stop holding unit is configured to hold the vehicle in the stopped state by boosting a brake fluid pressure to cause brake force to be the stop hold brake force or greater. The power-running-generative drive force calculation unit is configured to calculate, on the basis of an output power capacity of the battery, power-running-generative drive force that the motor is able to generate during power running. The traveling mode selection unit is configured to select an engine traveling mode in which the engine is driven in a case where the target drive force is greater than the power-running-generative drive force, and select an electric vehicle traveling mode in which the engine is stopped in a case where the target drive force is less than or equal to the power-running-generative drive force. The arithmetic unit is configured to calculate the required drive force by setting the required brake force to the stop hold brake force or greater in a case where the engine traveling mode is selected at an immediately preceding timing immediately before the vehicle stop timing. The arithmetic unit is configured to calculate the required brake force by setting the required drive force to the power-running-generative drive force or less in a case where the electric vehicle traveling mode is selected at the immediately preceding timing.

An aspect of the technology provides a vehicle control system configured to control a vehicle including an engine and a motor as drive sources. The motor is configured to be driven by electric power supplied from a battery. The vehicle control system includes circuitry. The circuitry is configured to calculate target drive force of the vehicle. The circuitry is configured to calculate required drive force used to control driving of the engine and the motor and required brake force used to control hydraulic brake on the basis of the target drive force. In a case where stop-timing brake force corresponding to the required brake force at a vehicle stop timing is not greater than or equal to stop hold brake force required to hold the vehicle in a stopped state, the circuitry is configured to hold the vehicle in the stopped state by boosting a brake fluid pressure to cause brake force to be the stop hold brake force or greater. The circuitry is configured to calculate, on the basis of an output power capacity of the battery, power-running-generative drive force that the motor is able to generate during power running. In a case where the target drive force is greater than the power-running-generative drive force, the circuitry is configured to select an engine traveling mode in which the engine is driven. In a case where the target drive force is less than or equal to the power-running-generative drive force, the circuitry is configured to select an electric vehicle traveling mode in which the engine is stopped. The circuitry is configured to calculate the required drive force by setting the required brake force to the stop hold brake force or greater in a case where the engine traveling mode is selected at an immediately preceding timing immediately before the vehicle stop timing. The circuitry is configured to calculate the required brake force by setting the required drive force to the power-running-generative drive force or less in a case where the electric vehicle traveling mode is selected at the immediately preceding timing.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

These days, electric (electrically-controlled) boosters are becoming the mainstream instead of typical vacuum pressure boosters. If a brake fluid pressure is boosted by an electric booster when a vehicle makes a stop, motor operation noise can be generated, which can make the user feel strange.

Further, when the brake fluid pressure is forcibly boosted for the vehicle hold function, the vehicle can behave unnaturally, which can also make the user feel strange.

It is desirable to reduce the feeling of strangeness of the user caused by a vehicle hold function.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
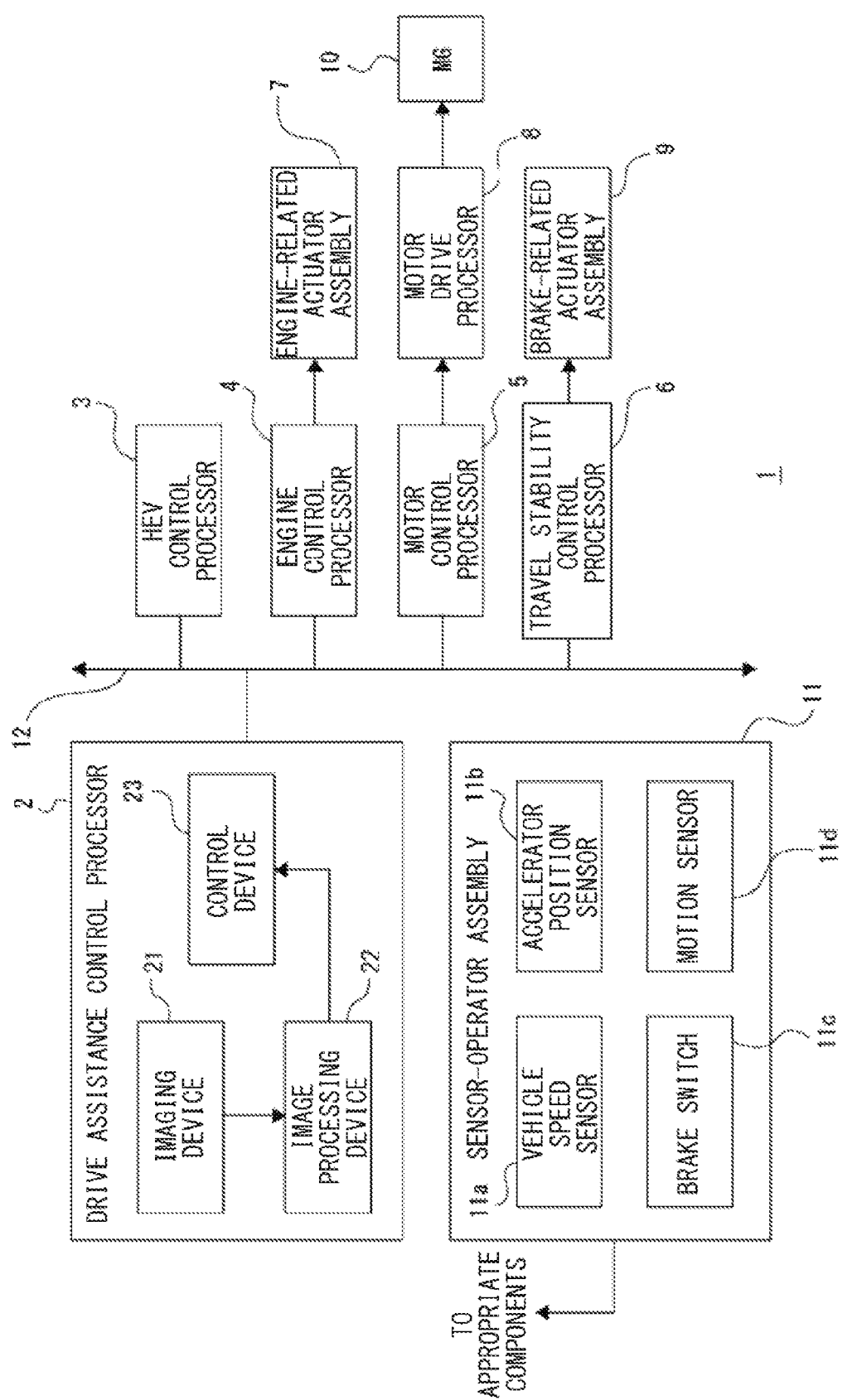
FIG. 1 is a block diagram of an exemplary configuration of a vehicle control system according to one example embodiment of the technology.

FIG. 1 is a block diagram illustrating an exemplary configuration of a vehicle control system 1 according to an example embodiment of the technology. Note that FIG. 1 illustrates only main components of the vehicle control system 1 relevant to the technology.

The vehicle control system 1 according to the present embodiment may be provided in a hybrid electric vehicle (HEV) that includes an engine and a motor generator (corresponding to a motor generator 10 described below) as drive sources.

As illustrated in FIG. 1, the vehicle control system 1 may include a drive assistance control processor 2, an HEV control processor 3, an engine control processor 4, a motor control processor 5, a travel stability control processor 6, an engine-related actuator assembly 7, a motor drive processor 8, a brake-related actuator assembly 9, a motor generator 10, a sensor-operator assembly 11, and a bus 12.

The drive assistance control processor 2 may include an imaging device 21, an image processing device 22, and a control device 23. The drive assistance control processor 2 may execute various control processes to assist driving of the vehicle (hereinafter referred to as a drive assistance control process).

The imaging device 21 may obtain an image data on an environment extending in a traveling direction of an own vehicle. In this example, the imaging device 21 may obtain an image data on an environment in front of the own vehicle. In this example, the imaging device 21 may include two cameras each including an optical system and an imaging element, such as a charge coupled device (CCD) or a complementary metal oxide semiconductor (CMOS). Each camera may cause the optical system to form an object image on an imaging surface of the imaging element and generate an electric signal based on the amount of received light on a pixel unit basis. These cameras may be disposed so as to enable ranging based on a so-called stereo imaging method. The electrical signal generated by each camera may be converted into a digital image signal (captured image data) through A/D conversion and a predetermined correction process. The captured image data may indicate the luminance value at each predetermined gray scale on a pixel basis. The captured image data may then be supplied to the image processing device 22.

The image processing device 22 may be a digital signal processor (DSP) or a microcomputer that includes a central processing unit (CPU), a read only memory (ROM), a random access memory (RAM), and so forth. The image processing device 22 may perform predetermined image processing on the captured image data obtained by the imaging device 21 to recognize an environment outside the own vehicle.

For example, the image processing device 22 may perform various image processing on the captured image data obtained through the stereo imaging method to obtain front environment information regarding a three-dimensional object or a lane line lying in front of the own vehicle. On the basis of the front environment information, the image processing device 22 may estimate a traveling road on which the own vehicle is traveling (hereinafter referred to as an own vehicle traveling road). Further, the image processing device 22 may detect a preceding vehicle traveling in front of the own vehicle on the own vehicle traveling road on the basis of the data on the three-dimensional object.

For example, the image processing device 22 may process the captured image data obtained through the stereo imaging method as follows. First, the image processing device 22 may perform triangulation of the captured image data, i.e., a pair of captured images on the basis of the difference between corresponding positions (parallax) to generate multiple pieces of distance information. Thereafter, the image processing device 22 may perform a known grouping process on the multiple pieces of distance information. The image processing device 22 may compare the distance information obtained as the result of the grouping process with preliminarily stored data regarding three-dimensional road shapes, three-dimensional objects, and so forth, to extract data regarding lane lines, side-walls such as guard rails and curbs extending along the road, and three-dimensional objects, such as vehicles, for example. The image processing device 22 may estimate the own vehicle traveling road on the basis of, for example, the data regarding lane lines and side walls, and detect a three-dimensional object traveling at a predetermined speed (e.g., 0 km/h or higher) in substantially the same direction as the own vehicle on the own vehicle traveling road, and extract the three-dimensional object as a preceding vehicle. If a preceding vehicle is detected, the image processing device 22 may calculate an inter-vehicle distance cd between the preceding vehicle and the own vehicle, a relative speed ds (i.e., the rate of change in the inter-vehicle distance cd), a preceding vehicle speed ss (the relative speed ds+an own vehicle speed js), and an acceleration rate sac of the preceding vehicle (i.e., the derivative of the preceding vehicle speed ss), as preceding vehicle information. The own vehicle speed js may be a traveling speed of the own vehicle detected by a vehicle speed sensor 11a described below, and also referred to as an "actual vehicle speed" as opposed to a set vehicle speed St described below. The image processing device 22 may recognize a preceding vehicle traveling at the preceding vehicle speed ss lower than a predetermined speed (e.g., 4 km/h or lower) and not being accelerated to be a preceding vehicle in a substantially stopped state.

The image processing device 22 may calculate the preceding vehicle information for each frame of the captured image data, for example, and store the calculated preceding vehicle information in a sequential manner.

The control device 23 may include a microcomputer including a CPU, a ROM, a RAM, and so forth, for example. The control device 23 may perform the drive assistance control process on the basis of the results of the image processing performed by the image processing device 22 or detection data and input operation data obtained by the sensor-operator assembly 11, for example.

The control device 23 may be coupled to the HEV control processor 3, the engine control processor 4, the motor control processor 5, and the travel stability control processor 6 with the bus 12. The HEV control processor 3, the engine control processor 4, the motor control processor 5, and the travel stability control processor 6 may each include a microcomputer. These control processors may establish mutual data communication. The control device 23 may achieve the drive assistance control process by transmitting a command to any of the control processors when needed.

As part of the drive assistance control process, the control device 23 may perform autocruise control. That is, the control device 23 may control the speed of the own vehicle to satisfy a designated traveling condition. In this example, the control device 23 may perform a process of achieving adaptive cruise control (ACC) as automatic cruise control, for example.

In the ACC, a target vehicle speed St and a target inter-vehicle distance Dt may be set in response to an operational input on a predetermined operator in the sensor-operator assembly 11. In this example, the driver may select any inter-vehicle distance mode from three modes: a long inter-vehicle distance mode, a middle inter-vehicle distance mode, and a short inter-vehicle distance mode. The control device 23 may set a different target inter-vehicle distance Dt for each selected inter-vehicle mode on the basis of the own vehicle speed js, for example. Note that the target vehicle speed St may be herein referred to as a "set vehicle speed St".

In a case where no preceding vehicle is detected in the ACC, the control device 23 may perform constant-speed travel control in which the own vehicle speed js is converged at the set vehicle speed St.

In a case where a preceding vehicle is detected in the constant-speed travel control, the control device 23 may perform following travel control in which the inter-vehicle distance cd between the own vehicle and the preceding vehicle is converged at the target inter-vehicle distance Dt. In this example, the control device 23 may perform the following travel control by causing the own vehicle to stop or start traveling following the preceding vehicle. That is, when the preceding vehicle stops, the control device 23 may cause the own vehicle to stop traveling, and when the preceding vehicle starts traveling afterwards, the control device 23 may cause the own vehicle to start traveling.

In the ACC, the control device 23 calculates target drive force required to achieve the constant-speed travel control and the following travel control described above.

In a condition where the ACC is not performed (e.g., while the acceleration or deceleration rate of the own vehicle is controlled on the basis of an accelerator operation or a brake operation performed by the driver), the control device 23 may calculate the target drive force on the basis of the accelerator operation or the brake operation performed by the driver.

The calculated target drive force may have a different polarity, namely, a positive value or a negative value, depending on whether the own vehicle is to be accelerated or decelerated. For example, the calculated target drive force may take a positive value if the own vehicle is to be accelerated, whereas a negative value if the own vehicle is to be decelerated.

In this example, the control device 23 calculates required drive force and required brake force on the basis of the calculated target drive force. The required drive force may be drive force of the own vehicle required to satisfy the target drive force. In this example in which the own vehicle includes the engine and the motor generator 10 as drive sources for the drive wheels, the required drive force may be the total drive force of both of the engine and the motor generator 10.

The required brake force may be brake force required to satisfy the target drive force.

As vehicle brake mechanisms, the HEV may include a hydraulic brake mechanism, such as a disc brake, and a regenerative brake system utilizing regenerative power of the motor generator 10. Thus, when the vehicle is to be decelerated, the required drive force as well as the required brake force may be calculated so that the vehicle will be decelerated on the basis of the calculated target drive force.

In this example, the control device 23 may also perform a process of achieving a vehicle hold function. With the vehicle hold function, a vehicle once being stopped may be held in a stopped state. For example, in a case where brake force required to stop the vehicle (hereinafter referred to as stop-timing brake force) is not greater than or equal to the brake force required to hold the vehicle in the stopped state (hereinafter referred to as stop hold brake force Tp), the control device 23 boosts the brake fluid pressure to the stop hold brake force Tp or greater using the vehicle hold function.

Note that the vehicle hold function will be described in detail later.

The sensor-operator assembly 11 may collectively indicate various sensors and operators provided in the own vehicle. Examples of the sensors in the sensor-operator assembly 11 may include a vehicle speed sensor 11a that detects the own vehicle speed js, an accelerator position sensor 11b that detects an accelerator position on the basis of the stepping quantity of the accelerator pedal, a brake switch 11c that is turned on or off in response to pressing or releasing the brake pedal, and a motion sensor 11d that includes an acceleration sensor or an angular sensor to detect a motion of the own vehicle.

Although not illustrated, the sensor-operator assembly 11 may further include other sensors, such as an engine revolution sensor that detects an engine revolution speed, an intake air flow sensor that detects the amount of air taken into the engine, a throttle position sensor that detects the position of a throttle valve disposed in the air intake passage to regulate the intake air flow to be supplied to each cylinder of the engine, a coolant temperature sensor that detects a coolant temperature indicative of the temperature of the engine, an outside air temperature sensor that detects the temperature outside the vehicle, and a gradient sensor that detects the gradient of the own vehicle traveling road.

Examples of the operators in the sensor-operator assembly 11 may include a start switch that sends a command to start or stop the vehicle control system 1, and other operators that perform operations relevant to the ACC described above.

The HEV control processor 3 may control the motion of the vehicle by sending a command to the engine control processor 4 and the motor control processor 5 on the basis of the required drive force calculated by the control device 23 in the drive assistance control processor 2.

The HEV control processor 3 may calculate required engine drive force and required motor drive force on the basis of the required drive force received from the control device 23. The required engine drive force may be force required to drive the engine, and the required motor drive force may be force required to drive the motor generator 10. The HEV control processor 3 may send the engine control processor 4 a command to generate the required engine drive force, and send the motor control processor 5 a command to generate the required motor drive force.

The engine control processor 4 may control various engine-related actuators in the engine-related actuator assembly 7 on the basis of the command about the required engine drive force received from the HEV control processor 3. Examples of the engine-related actuators in the engine-related actuator assembly 7 may include a throttle actuator that drives a throttle valve, and an injector that injects a fuel.

The engine control processor 4 may control the output of the engine by controlling fuel injection timing, a pulse width of fuel injection, a throttle position, and so forth, on the basis of the required engine drive force. The engine control processor 4 may also control starting or stopping of the engine.

The motor control processor 5 may control the movement of the motor generator 10 by controlling the motor drive processor 8 on the basis of the data on the required motor drive force received from the HEV control processor 3. The motor drive processor 8 may be electric circuitry including a drive circuit for the motor generator 10.

When the motor generator 10 needs to perform power running, the motor control processor 5 may send the motor drive processor 8 a command based on the required motor drive force to cause the motor generator 10 to perform power running. When the motor generator 10 needs to generate regenerative power, the motor control processor 5 may send the motor drive processor 8 a command based on the required motor drive force to cause the motor generator 10 to generate regenerative power.

Although not illustrated, the vehicle control system 1 may include a travel battery serving as a power source for the motor generator 10. The travel battery may be charged with regenerative electric power generated by the motor generator 10.

The travel stability control processor 6 may perform travel stability control of the vehicle, such as vehicle dynamics control (VDC). As part of the travel stability control, the travel stability control processor 6 may control the hydraulic brake. The travel stability control processor 6 may control the brake fluid pressure by controlling the brake-related actuators in the brake-related actuator assembly 9 on the basis of the command about the required brake force received from the control device 23. Examples of the brake-related actuators in the brake-related actuator assembly 9 may include a brake fluid pressure control actuator that controls the pressure of the brake fluid outputted from the brake booster to the master cylinder or the pressure of the brake fluid in the brake fluid pipe. For example, the travel stability control processor 6 may cause the own vehicle to perform a braking operation by controlling the brake fluid pressure control actuator on the basis of the required brake force.

Figure 2:
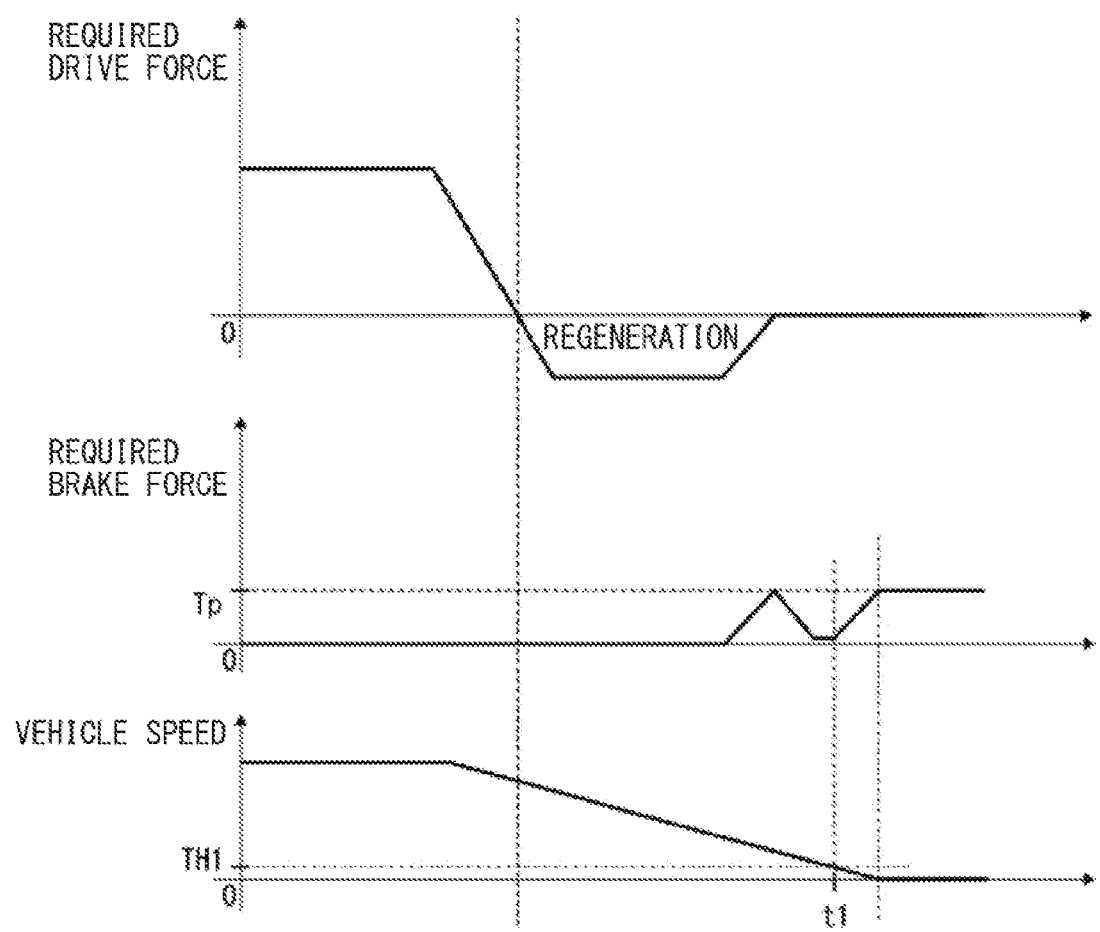
FIG. 2 is an explanatory diagram illustrating a vehicle hold function according to one example embodiment of the technology.

FIG. 2 is an explanatory diagram illustrating the vehicle hold function. FIG. 2 illustrates exemplary transitions of the required drive force, the required brake force, and the own vehicle speed js observed when the vehicle is decelerated under the ACC and then held in the stopped state. In the example illustrated in FIG. 2, the vehicle may travel at a constant speed before being decelerated.

After the vehicle traveling at the constant speed starts decelerating, the required drive force may shift from a positive value to a negative value at a predetermined timing. This may cause the motor generator 10 to generate regenerative electric power (i.e., regenerative braking may be performed). As illustrated in FIG. 2, the regenerative braking may end before the vehicle is stopped. For example, when the vehicle speed becomes lower than or equal to a predetermined speed, the required drive force may be gradually increased toward 0 (zero), and the required brake force may be gradually increased accordingly. As a result, the regenerative braking may be switched to braking performed by the hydraulic brake mechanism.

Thereafter, at a timing immediately before the vehicle is stopped, the increased required brake force may be gradually decreased to reduce the shock to be caused by the stop of the vehicle.

As described above, in a case where the stop-timing brake force, which is the required brake force to stop the vehicle, is not greater than or equal to the stop hold brake force Tp of a predetermined value, the brake fluid pressure is boosted to the stop hold brake force Tp or greater in order to hold the vehicle in the stopped state using the vehicle hold function.

The stop hold brake force Tp may be the required brake force to hold the vehicle in the stopped state. The stop hold brake force Tp may be a limit value (e.g., lower limit value) of the brake force required to hold the vehicle in the stopped state, or may be calculated by adding a margin to the limit value (i.e., the limit value+α).

In this example, in a case where the stop-timing brake force is greater than or equal to the stop hold brake force Tp, the required brake force may be continuously maintained at the stop-timing brake force using the vehicle hold function.

In this example, the vehicle may be determined as being stopped on the basis of a first threshold TH1 of the vehicle speed. For example, the vehicle may be determined as being stopped when the vehicle speed becomes lower than or equal to the first threshold TH1. Note that the first threshold TH1 should not be strictly limited to a threshold for determining whether the vehicle speed becomes 0 km/h, but may be any threshold for determining whether the vehicle is determined as being stopped. For example, the first threshold TH1 may be set to a value within a range from 0 km/h to 1 km/h. In this example, the first threshold TH may be 0.5 km/h.

In FIG. 2, the vehicle may be determined as being stopped at a vehicle stop timing t1.

Using the vehicle hold function, it is determined whether the required brake force at the vehicle stop timing (i.e., the stop-timing brake force) is greater than or equal to the stop hold brake force Tp. In the example illustrated in FIG. 2, the stop-timing brake force is less than the stop hold brake force Tp. Thus, the required brake force is increased to the stop hold brake force Tp or greater using the vehicle hold function. As a result, the brake fluid pressure is boosted to the brake fluid pressure required to hold the vehicle in the stopped state or higher. The vehicle is held in the stopped state with the boosted brake fluid pressure.

In this example, the above-described processes to achieve the vehicle hold function, such as the determination as to whether the vehicle is determined as being stopped, the determination as to whether the brake fluid pressure is to be increased based on the stop hold brake force Tp, and the control to boost the brake fluid pressure when needed, may be performed by the travel stability control processor 6, for example.

Now described is the control to stop the vehicle (hereinafter referred to as vehicle stop control) according to an example embodiment of the technology.

Figure 3:
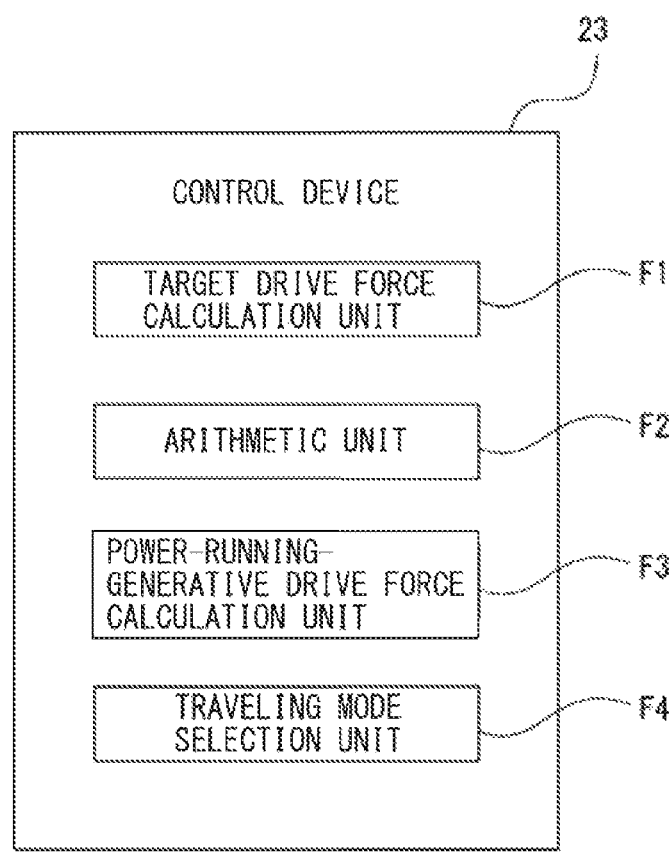
FIG. 3 is a block diagram illustrating vehicle stop control according to one example embodiment of the technology.

FIG. 3 is a block diagram for explaining the vehicle stop control according to the present example embodiment. FIG. 3 illustrates functions of the control device 23 in the drive assistance control processor 2 according to the present example embodiment.

As illustrated in FIG. 3, the control device 23 includes a target drive force calculation unit F1, an arithmetic unit F2, a power-running-generative drive force calculation unit F3, and a traveling mode selection unit F4.

The target drive force calculation unit F1 calculates the target drive force described above.

The arithmetic unit F2 calculates the required drive force used to control driving of the motor generator 10 and the required brake force used to control the hydraulic brake on the basis of the target drive force.

The power-running-generative drive force calculation unit F3 calculate power-running-generative drive force Dth, which is drive force that the motor generator 10 is able to generate during power running. For example, the control device 23 may calculate the power-running-generative drive force Dth on the basis of the output power capacity of the non-illustrated travel battery serving as the power source for the motor generator 10.

The output power capacity of the travel battery may be calculated by the control device 23 on the basis of the state of charge (SOC), the voltage, and the temperature of the travel battery, for example.

In this example, the power-running-generative drive force calculation unit F3 calculates the power-running-generative drive force Dth on the basis of the output power capacity of the travel battery calculated in this manner, and the temperature of the motor generator 10.

Alternatively, the power-running-generative drive force Dth may be calculated on the basis of the temperature of a non-illustrated inverter that drives the motor generator 10 as well as the output power capacity of the travel battery and the temperature of the motor generator 10.

The traveling mode selection unit F4 switches the traveling mode of the vehicle between the engine traveling mode and the electric vehicle (EV) traveling mode on the basis of the power-running-generative drive force Dth calculated as described above and the target drive force calculated by the target drive force calculation unit F1. In the engine traveling mode, the vehicle is caused to travel by the engine. In the EV traveling mode, the vehicle is caused to travel by the motor with the engine being stopped.

The control device 23 selects the engine traveling mode in a case where the target drive force is greater than the power-running-generative drive force Dth. The control device 23 selects the EV traveling mode in a case where the target drive force is less than or equal to the power-running-generative drive force Dth.

According to the present example embodiment, in a case where the engine traveling mode is selected at a timing immediately before the vehicle stop timing (hereinafter referred to as an immediately preceding timing), the arithmetic unit F2 calculates the required drive force, setting the required brake force to the stop hold brake force Tp or greater. In a case where the EV traveling mode is selected, the arithmetic unit F2 calculates the required brake force, setting the required drive force to the power-running-generative drive force Dth or less.

Figure 4A:
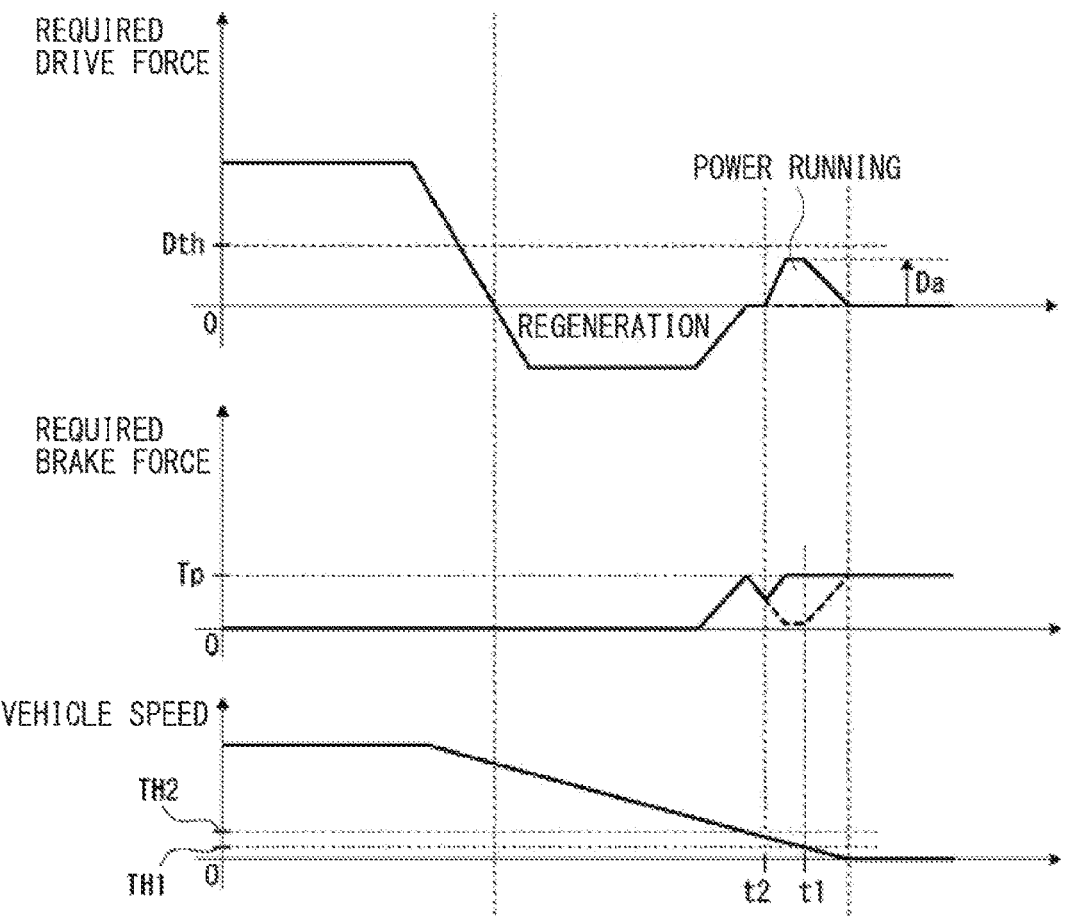
FIG. 4A and FIG. 4B are charts illustrating the vehicle stop control according to one example embodiment of the technology.
Figure 4B:
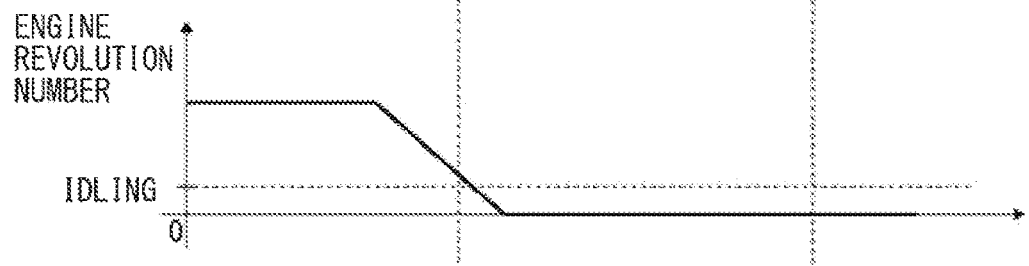
Figure 5:
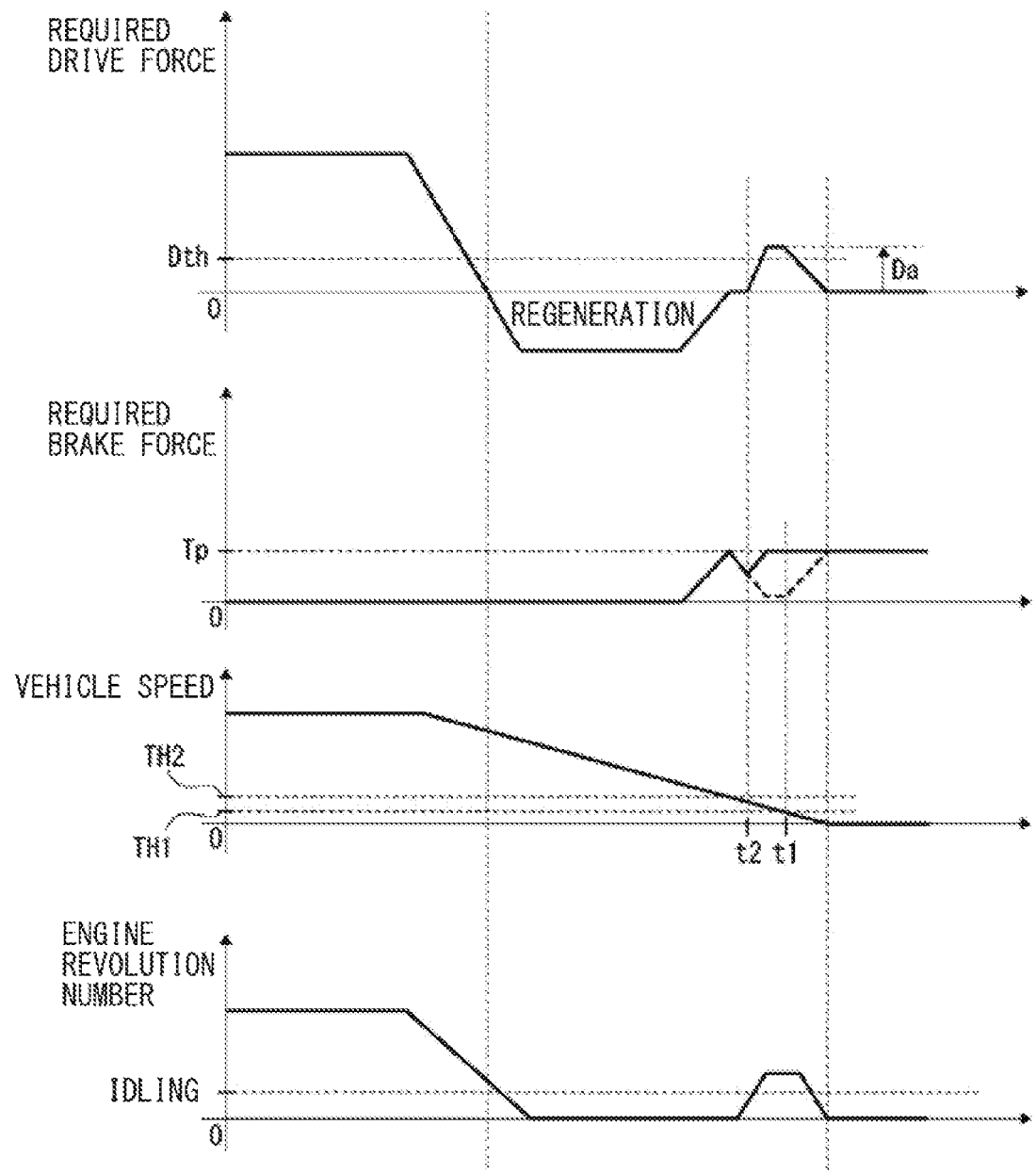
FIG. 5 is a chart illustrating the vehicle stop control according to one example embodiment of the technology.
Figure 6:
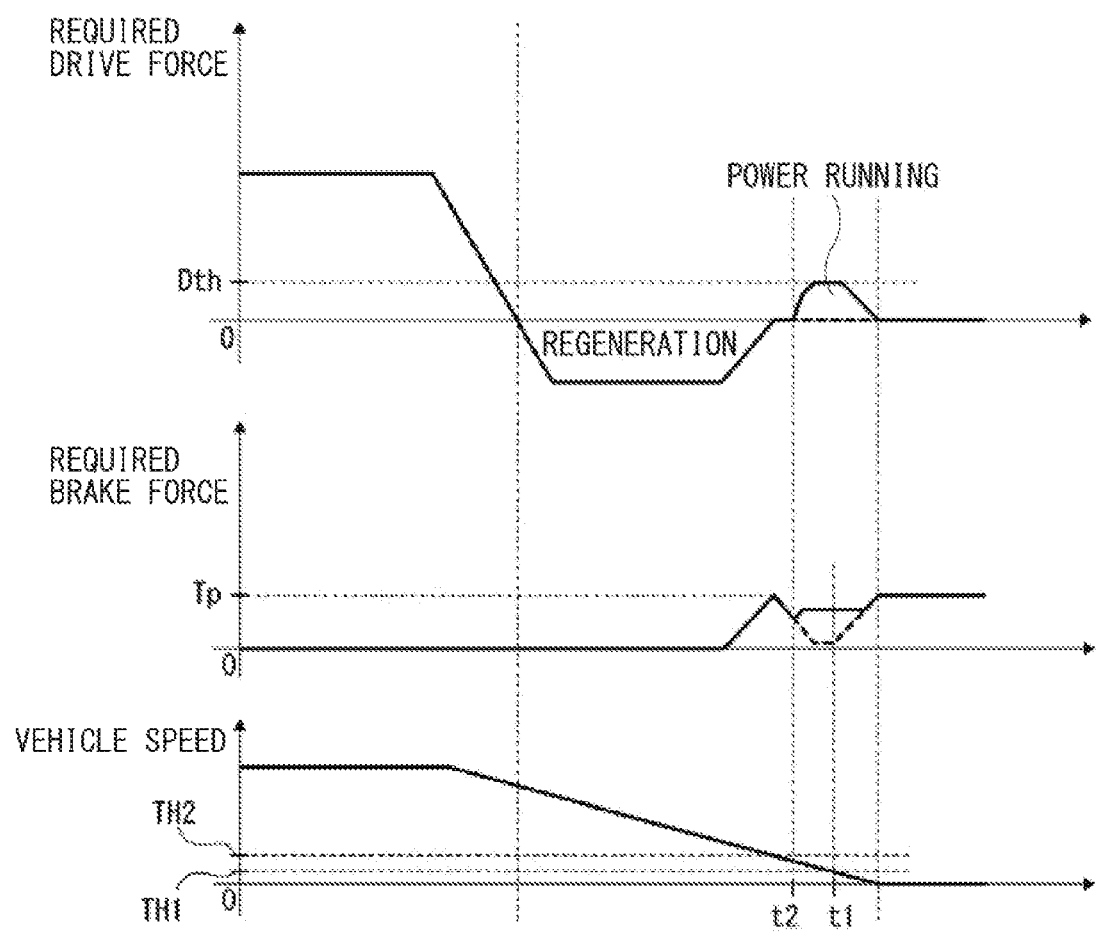
FIG. 6 is a chart illustrating an exemplary relationship between the required brake force and the required drive force observed when it is estimated that the engine will need to restart.

With reference to FIGS. 4 to 6, exemplary vehicle stop control according to the present example embodiment is described.

As in FIG. 2, FIG. 4A illustrates exemplary transitions of the required drive force, the required brake force, and the vehicle speed observed when the vehicle is decelerated under the ACC and then held in the stopped state.

Boosting the brake fluid pressure to the one required to hold the vehicle in the stopped state or greater at the immediately preceding timing may be supposed to prevent the brake fluid pressure from being boosted at the vehicle stop timing using the vehicle hold function. Accordingly, in this example, it is determined at the immediately preceding timing whether the required brake force is greater than or equal to the stop hold brake force Tp. The immediately preceding timing may be determined when a condition that the accelerator is not operated and a condition that the vehicle speed is less than or equal to a second threshold TH2 are satisfied. Note that the second threshold TH2 may be greater than the first threshold TH1 (TH1>TH2). For example, the second threshold TH2 may be set within a range from 2 km/h to 10 km/h.

In FIG. 4A, a timing t2 may correspond to the immediately preceding timing determined on the basis of the vehicle speed and the second threshold TH2.

If the required brake force is not greater than or equal to the stop hold brake force Tp at the immediately preceding timing, it may be estimated that the required brake force will not be greater than or equal to the stop hold brake force Tp also at the vehicle stop timing. That is, it is estimated that the brake fluid pressure is highly likely to be boosted at the vehicle stop timing using the vehicle hold function. Thus, if the required brake force is not greater than or equal to the stop hold brake force Tp at the immediately preceding timing, the required brake force is increased to the stop hold brake force Tp or greater (refer to an increase in the brake force after the timing t2 illustrated in FIG. 2).

This makes it possible to boost the brake fluid pressure to the brake fluid pressure required to hold the vehicle in the stopped state or greater at a timing before the vehicle stop timing, preventing the brake fluid pressure from being boosted at the vehicle stop timing using the vehicle hold function. That is, it is possible to reduce the feeling of strangeness of the user caused by a pressure boosting noise generated at the vehicle stop timing.

When the required brake force is increased as described above, the increment of the brake force needs to be offset by the drive force to satisfy the target drive force. Thus, as illustrated in FIG. 4A comparing the required brake force and the required drive force, when the required brake force is increased, the required drive force needs to be increased in accordance with the increment of the required brake force.

In FIG. 4A, the required drive force may be increased by an increment Da to offset the increment of the required brake force. Hereinafter, the increment Da may be referred to as an increased drive force Da.

The increased drive force Da can be generated by driving only the motor generator 10 in some cases, but not in other cases (i.e., the increased drive force Da needs to be generated by driving both of the motor generator 10 and the engine). For example, if the increased drive force Da is less than the power-running-generative drive force Dth of the motor generator 10 as illustrated in FIG. 4A and FIG. 4B, the increased drive force Da can be generated by driving only the motor generator 10.

While the vehicle is decelerating to stop, the target drive force (the required drive force) may gradually decrease, and the required engine drive force may also gradually decrease accordingly and reach zero at some timing. Thus, the engine may be generally stopped at some timing before the vehicle stop timing. For example, the engine may be generally stopped at a timing before the timing t2, as illustrated in FIG. 4B.

As described above, in a case where the increased drive force Da is less than or equal to the power-running-generative drive force Dth, there is no need to restart the engine to preliminarily boost the brake fluid pressure at the timing t2.

In contrast, as illustrated in FIG. 5, the increased drive force Da can be greater than the power-running-generative drive force Dth when the power-running-generative drive force Dth is relatively small due to a shortage of the SOC of the travel battery, for example.

In such a case, the increased drive force Da cannot be generated by driving only the motor generator 10. Thus, there is a need to restart the engine to preliminarily boost the brake fluid pressure at the timing t2, as illustrated in FIG. 5.

In such a case where the engine needs to restart, the engine once having been stopped to stop the vehicle is restarted immediately before the vehicle stop timing. This can make the user feel strange.

In the present example embodiment addressing such a concern, in a case where the engine traveling mode is selected at the immediately preceding timing, the required drive force is calculated, setting the required brake force to the stop hold brake force Tp or greater; whereas, in a case where the EV traveling mode is selected at the immediately preceding timing, the required brake force is calculated, setting the required drive force to the power-running-generative drive force or less, as in the above description as to the function of the arithmetic unit F2.

In a case where the engine traveling mode is selected at the immediately preceding timing, i.e., if the engine is not stopped at the immediately preceding timing, there is no need to restart the engine. Thus, the required brake force is set to the stop hold brake force Tp or greater, as described above.

In contrast, in a case where the EV traveling mode is selected at the immediately preceding timing, i.e., if the engine is stopped at the immediately preceding timing, the following processes may be performed, for example.

First, it may be determined whether the required brake force is greater than or equal to the stop hold brake force Tp. If the required brake force is greater than or equal to the stop hold brake force Tp, there is no need to boost the brake fluid pressure at the immediately preceding timing. Thus, the currently-set required brake force may be maintained.

In contrast, if the required brake force is not greater than or equal to the stop hold brake force Tp, it may be estimated on the basis of the power-running-generative drive force Dth whether the engine will need to restart when the brake force is increased to the stop hold brake force Tp. This estimation may be performed as a determination as to whether the power-running-generative drive force Dth is less than the increased drive force Da (generated when the required brake force is increased to the stop hold brake force Tp). If the power-running-generative drive force Dth is less than the increased drive force Da, it may be estimated that the engine will need to restart. In contrast, if the power-running-generative drive force Dth is not less than the increased drive force Da, it may be estimated that the engine will not need to restart.

If it is estimated that the engine will not need to restart when the brake force is increased to the stop hold brake force Tp, the required brake force is set to the stop hold brake force Tp or greater, as illustrated in FIG. 4A and FIG. 4B.

In such a case where the engine will not need to restart, i.e., if the power-running-generative drive force Dth is greater than or equal to the increased drive force Da, it is practically possible to increase the required brake force to a value greater than the stop hold brake force Tp within an allowable range of the power-running-generative drive force Dth. However, such a pressure increase exceeding the stop hold brake force Tp can lead to a waste of power.

Thus, in the present example embodiment, the required brake force may be increased to the stop hold brake force Tp in a case where it is estimated that the engine will not need to restart.

Accordingly, it is possible to save the power of the vehicle while reducing the feeling of strangeness of the user caused by the vehicle hold function.

In contrast, if it is estimated that the engine will need to restart when the brake force is increased to the stop hold brake force Tp, the required brake force may be increased within the allowable range of the power-running-generative drive force Dth.

For example, the required brake force may be increased by the amount required to offset the difference between the power-running-generative drive force Dth and the required drive force (i.e., the power-running-generative drive force Dth—the required drive force). Here, the required drive force may be the required drive force at the immediately preceding timing. Note that, while the vehicle is decelerating to stop, the required drive force at the immediately preceding timing may be 0 (zero) in almost every case.

FIG. 6 illustrates an exemplary relationship between the required brake force and the required drive force observed when the required brake force is increased only by the amount required to offset the difference between the power-running-generative drive force Dth and the required drive force (i.e., the power-running-generative drive force Dth—the required drive force).

In this case, the required drive force after being increased to offset the increment of the brake force is not greater than the power-running-generative drive force Dth, as illustrated in FIG. 6. This prevents the engine from restarting upon the control to increase the brake force at the immediately preceding timing (i.e., the timing t2).

Further, in this case, the required brake force at and after the timing t2 does not reach the stop hold brake force Tp. Thus, the brake fluid pressure needs to be boosted at the vehicle stop timing using the vehicle hold function. However, the brake fluid pressure has been preliminarily boosted from the timing t2. Accordingly, it is possible to reduce the amount of brake fluid pressure to be boosted at the vehicle stop timing.

The pressure boosting noise caused by the vehicle hold function may be an operation noise of the brake fluid pressure control actuator (e.g. the motor). The pressure boosting noise may be reduced to a volume imperceptible by the user (e.g., the occupant) by decreasing the increment of the brake fluid pressure.

Since the brake fluid pressure is boosted to a certain level, if not to the stop hold brake force, at the immediately preceding timing as described above, it is possible to reduce the feeling of strangeness of the user caused when the brake fluid pressure is boosted by the vehicle hold function.

Here, in a case where it is estimated that the engine will need to restart, i.e., where the power-running-generative drive force Dth is less than the increased drive force Da, the power-running-generative drive force Dth can be too small, and the increment of the brake fluid pressure at the timing t2 can also be too small. This can result in a too large increment of the brake fluid pressure at the timing t1. That is, there can be a case where it is difficult to sufficiently reduce the pressure boosting noise that can make the user feel strange when the vehicle hold function is achieved.

In the present example embodiment addressing such a concern, in a case where it is estimated that the engine will need to restart and where the power-running-generative drive force Dth is less than a predetermined threshold THs, the required brake force may be increased to the stop hold brake force Tp or greater.

Accordingly, if it is estimated that the feeling of strangeness of the user to be caused when a pressure boosting noise is generated due to the vehicle hold function is greater than the feeling of strangeness of the user to be caused when the engine is restarted, the engine is restarted to preferentially reduce the feeling of strangeness of the user to be caused by the pressure boosting noise. Even in such a case, it is possible to increase the brake liquid pressure to the stop hold brake force Tp or greater.

Exemplary procedures for achieving the vehicle stop control according to the foregoing example embodiment will now be described with reference to flowcharts in FIGS. 7 and 8.

Figure 7:
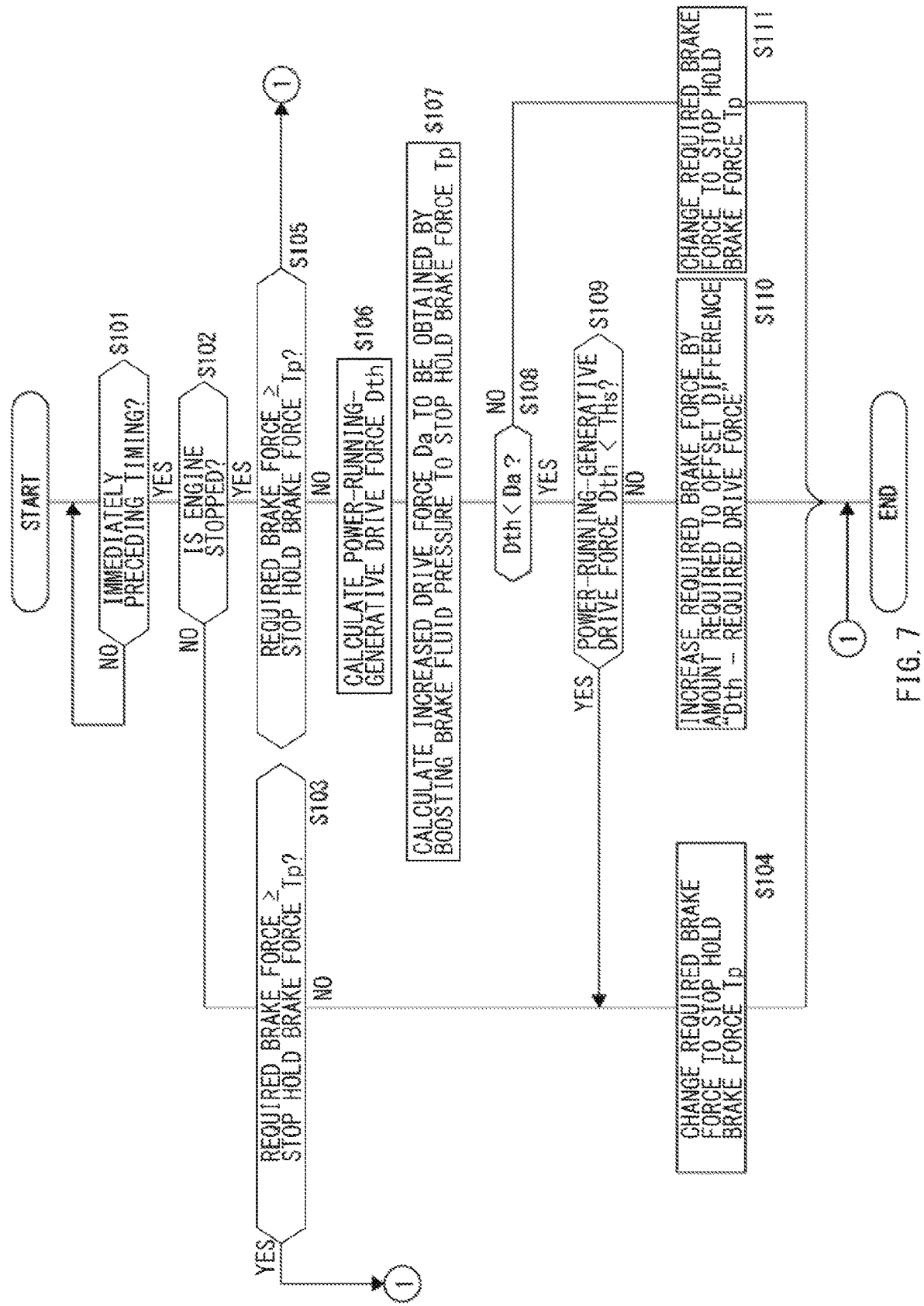
FIG. 7 is a flowchart illustrating a first exemplary procedure of the vehicle stop control according to one example embodiment of the technology.
Figure 8:
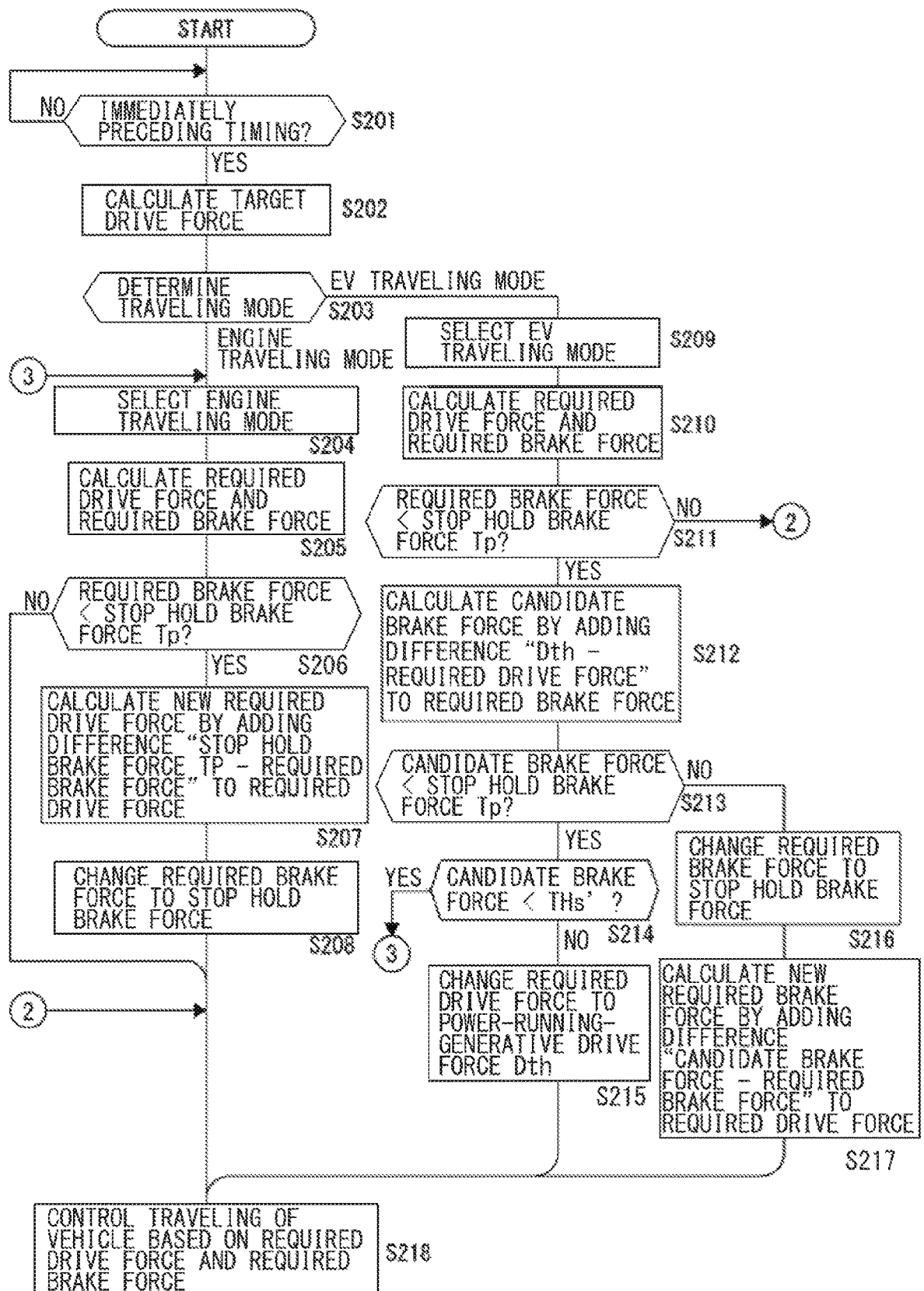
FIG. 8 is a flowchart illustrating a second exemplary procedure of the vehicle stop control process according to one example embodiment of the technology.

Note that, in this example, the procedures illustrated in FIGS. 7 and 8 may be performed by the drive assistance control processor 2 on the basis of programs stored in a predetermined memory such as ROM.

FIG. 7 illustrates a first exemplary procedure of the vehicle stop control process according to an example embodiment.

First, the control device 23 may wait for the arrival of the immediately preceding timing (Step S101). For example, the control device 23 may wait until the vehicle speed becomes less than or equal to the second threshold TH2 described above.

If the arrival of the immediately preceding timing is determined (Step S101: YES), the control device 23 may cause the procedure to proceed to Step S102. In Step S102, the control device 23 may determine whether the engine is stopped. If the engine is not being stopped (S102: NO), the control device 23 may cause the procedure to proceed to Step S103. In Step S103, the control device 23 may determine whether the required brake force is greater than or equal to the stop hold brake force Tp. If the required brake force is not greater than or equal to the stop hold brake force Tp (Step S103: NO), the control device 23 may cause the procedure to proceed to Step S104. In Step S104, the control device 23 may change the required brake force to the stop hold brake force Tp, and end the procedure illustrated in FIG. 7.

In contrast, if the required brake force is greater than or equal to the stop hold brake force Tp (Step S103: YES), the control device 23 may cause the procedure to skip Step S104 and end the procedure illustrated in FIG. 7.

As described above, in a case where the engine is not stopped at the immediately preceding timing and where the required brake force is not greater than or equal to the stop hold brake force Tp, the brake fluid pressure may be boosted to a pressure corresponding to the stop hold brake force Tp. In contrast, in a case where the required brake force is greater than or equal to the stop hold brake force Tp, the procedure may end without boosting the brake fluid pressure.

If the engine is stopped (Step S102: YES), the control device 23 may cause the procedure to proceed to Step S105. In Step S105, the control device 23 may determine whether the required brake force is greater than or equal to the stop hold brake force Tp. If the required brake force is greater than or equal to the stop hold brake force Tp (Step S105: YES), the control device 23 may end the procedure illustrated in FIG. 7. That is, if the required brake force is greater than or equal to the stop hold brake force Tp at the immediately preceding timing, the brake fluid pressure is not boosted at the immediately preceding timing.

If the required brake force is not greater than or equal to the stop hold brake force Tp (Step S105: NO), the control device 23 may may cause the procedure to proceed to Step S106. In Step S106, the control device 23 may calculate the power-running-generative drive force Dth. In this example, the control device 23 may calculate the power-running-generative drive force Dth on the basis of the output power capacity of the travel battery and the temperature of the motor generator 10, as described above.

Thereafter, in Step S107, the control device 23 may calculate the increased drive force Da to be obtained by boosting the brake fluid pressure to the stop hold brake force Tp. The increased drive force Da may be calculated by adding the drive force required to offset the stop hold brake force Tp to the required drive force.

Thereafter, in Step S108, the control device 23 may determine whether the power-running-generative drive force Dth is less than the increased drive force Da. The process in Step S108 may correspond to the process of determining whether to restart the engine in order to boost the brake fluid pressure, setting the required brake force to the stop hold brake force Tp.

If the power-running-generative drive force Dth is less than the increased drive force Da, i.e., if it is estimated that the engine will need to restart (Step S108: YES), the control device 23 may determine whether the power-running-generative drive force Dth is less than the threshold THs (Step S109). If the power-running-generative drive force Dth is less than the threshold THs, (Step S109: YES), the control device 23 may cause the procedure to proceed to Step S104 described above.

Accordingly, in a case where the power-running-generative drive force Dth is too small and where it is estimated that the feeling of strangeness of the user to be caused when a pressure boosting noise is generated due to the vehicle hold function is greater than the feeling of strangeness of the user caused when the engine is restarted, the required brake force may be set to the stop hold brake force Tp. That is, the engine may be allowed to restart.

In contrast, if the power-running-generative drive force Dth is not less than the threshold THs (Step S109: NO), the control device 23 may cause the procedure to proceed to Step S110. In Step S110, the required brake force may be increased by the amount required to offset the difference between the power-running-generative drive force Dth and the required drive force (i.e., the power-running-generative drive force Dth—the required drive force), and the procedure illustrated in FIG. 7 may end.

Accordingly, in a case where the power-running-generative drive force Dth is small and where there is a need to restart the engine upon boosting the brake fluid pressure to hold the vehicle in the stopped state, the required brake force may be set to such a value that prevents the required drive force from exceeding the power-running-generative drive force Dth. Therefore, it is possible to prevent the engine from restarting, and, at the same time, to reduce the amount of the brake fluid pressure to be boosted using the vehicle hold function at the vehicle stop timing.

If the power-running-generative drive force Dth is not less than the increased drive force Da, i.e., if the engine will not need to restart (Step S108: NO), the control device 23 may cause the procedure to proceed to Step S111. In Step S111, the required brake force may be changed to the stop hold brake force Tp, and the procedure illustrated in FIG. 7 may end.

Accordingly, in a case where the power-running-generative drive force Dth is large and where there is no need to restart the engine, the required brake force may be set to the stop hold brake force Tp. This prevents the brake fluid pressure from being boosted by the vehicle hold function. Therefore, it is possible to reduce the feeling of strangeness of the user caused by the vehicle hold function.

FIG. 8 illustrates a second exemplary procedure of the vehicle stop control process according to an example embodiment.

The second exemplary procedure may be different from the first exemplary procedure mainly in that the estimation as to whether the engine will need to restart when the brake fluid pressure is boosted setting the required brake force to the stop hold brake force Tp is made on the basis of a candidate brake fluid pressure.

First, the control device 23 may wait for the arrival of the immediately preceding timing (Step S201). If the arrival of the immediately preceding timing is determined (Step S201: YES), the control device 23 may calculate the target drive force in Step S202.

Thereafter, in Step S203, the control device 23 may perform a process of determining the traveling mode of the vehicle. That is, the control device 23 may determine which traveling mode of the engine traveling mode and the EV traveling mode is to be selected on the basis of the target drive force and the power-running-generative drive force Dth. For example, the control device 23 may determine whether the target drive force is greater than the power-running-generative drive force Dth. If the target drive force is greater than the power-running-generative drive force Dth, the control device 23 may determine that the engine traveling mode is to be selected. If the target drive force is not greater than the power-running-generative drive force Dth, the control device 23 may determine that the EV traveling mode is to be selected.

If it is determined that the engine traveling mode is to be selected as the target drive force is greater than the power-running-generative drive force Dth in Step S203, the control device 23 may cause the procedure to proceed to Step S204.

In Step S204, the control device 23 may select the engine traveling mode, and cause the procedure to proceed to Step S205.

In Step S205, the control device 23 may calculate the required drive force and the required brake force. For example, the control device 23 may calculate the required drive force and the required brake force on the basis of the target drive force calculated in Step S202.

Thereafter, in Step S206, the control device 23 may determine whether the required brake force is less than the stop hold brake force Tp. If the required brake force is less than the stop hold brake force Tp (Step S206: YES), the control device 23 may cause the procedure to proceed to Step S207. In Step S207, the control device 23 may calculate a new required drive force by adding the difference between the stop hold brake force Tp and the required brake force (i.e., the stop hold brake force Tp—the required brake force) to the required drive force.

Thereafter, in Step S208, the control device 23 may change the required brake force to the stop hold brake force and cause the procedure to proceed to Step S218.

In Step S218, the control device 23 may control traveling of the vehicle on the basis of the required drive force and the required brake force. That is, the control device 23 may send a command about the required drive force to the HEV control processor 3 and a command about the required brake force to the travel stability control processor 6 to control traveling of the vehicle on the basis of the required drive force and the required brake force. After the process in Step S218, the control device 23 may end the procedure illustrated in FIG. 8.

In a case where the engine traveling mode is selected (i.e., the engine is not stopped) at the immediately preceding timing and where the required brake force is less than the stop hold brake force Tp (Step S206: YES), the required brake force may be set to the stop hold brake force Tp through Steps S207, S208, and S218 described above. That is, the brake fluid pressure may be preliminarily boosted to a pressure enough to hold the vehicle in the stopped state at the immediately preceding timing.

If the required brake force is not less than the stop hold brake force Tp (Step S206: NO), the control device 23 may cause the procedure to skip Steps S207 and S208, and cause the procedure to proceed to Step S218.

Accordingly, in a case where the engine traveling mode is selected at the immediately preceding timing and where the required brake force is greater than or equal to the stop hold brake force Tp, traveling of the vehicle may be controlled on the basis of the required drive force and the required brake force calculated in Step S205.

If it is determined that the EV traveling mode is to be selected because the target drive force is not greater than the power-running-generative drive force Dth in Step S203 described above, the control device 23 may select the EV traveling mode in Step S209, calculate the required drive force and the required brake force in Step S210, and determine whether the required brake force is less than the stop hold brake force Tp in Step S211. If the required brake force is not less than the stop hold brake force Tp (Step S211: NO), the control device 23 may cause the procedure to proceed to Step S218.

Accordingly, in a case where the EV traveling mode is selected at the immediately preceding timing and where the required brake force is greater than or equal to the stop hold brake force Tp, traveling of the vehicle may be controlled on the basis of the required drive force and the required brake force calculated in Step S210.

If the required brake force is less than the stop hold brake force Tp (Step S211: YES), the control device 23 may determine candidate brake force in Step S212. The candidate brake force may be calculated by adding the difference between the power-running-generative drive force Dth and the required drive force (i.e., the power-running-generative drive force Dth—the required drive force) to the required brake force. For example, the candidate brake force may be calculated by adding brake force required to offset the difference between the power-running-generative drive force Dth and the required drive force (i.e., the power-running-generative drive force Dth—the required drive force) to the required brake force.

Figure 9A:
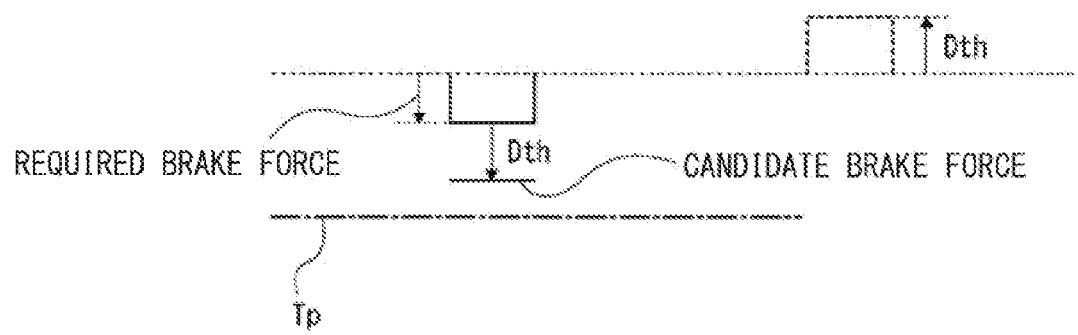
FIG. 9A is a diagram illustrating an example of candidate brake force.
Figure 9B:
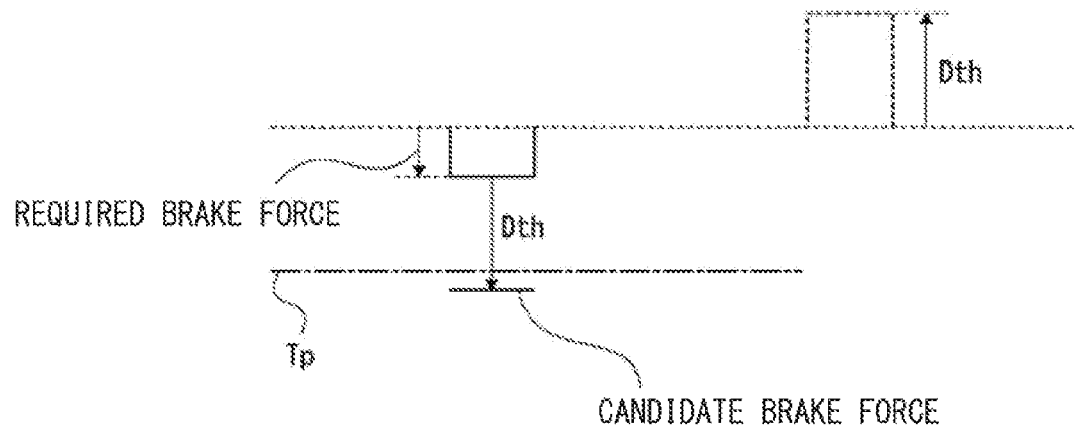
FIG. 9B is a diagram illustrating another example of the candidate brake force.

FIGS. 9A and 9B illustrate examples of the candidate brake force.

Note that the required drive force is set to 0 (zero) in the example illustrated in FIGS. 9A and 9B.

FIG. 9A illustrates an example of the candidate brake force set in a case where the power-running-generative drive force Dth is small. FIG. 9B illustrates an example of the candidate brake force set in a case where the power-running-generative drive force Dth is large.

As the power-running-generative drive force Dth decreases, the candidate brake force can decrease and become less than the stop hold brake force Tp, as illustrated in FIG. 9A. In contrast, as the power-running-generative drive force Dth increases, the candidate brake force can increase and become larger than the stop hold brake force Tp, as illustrated in FIG. 9B.

Returning to FIG. 8, after calculating the candidate brake force in Step S212, the control device 23 may determine whether the candidate brake force is less than the stop hold brake force Tp in Step S213. The process in Step S213 may correspond to the process in Step S108 in FIG. 7, namely, the process of estimating whether the engine will need to restart when the brake fluid pressure is boosted, setting the required brake force to the stop hold brake force Tp.

If the candidate brake force is less than the stop hold brake force Tp, i.e., if there is a need to restart the engine (Step S213: YES), the control device 23 may cause the procedure to proceed to Step S214. In Step S214, it may be determined whether the candidate brake force is less than a threshold THs'. The process in Step S214 may correspond to the process in Step S109 in FIG. 7, namely, the process of determining whether the power-running-generative drive force Dth is too small. The threshold THs' may be obtained by converting the threshold THs for the drive force into one for the candidate brake force.

If the candidate brake force is less than the threshold THs' (Step S214: YES), the control device 23 may cause the procedure to proceed to Step S204.

Accordingly, in a case where the EV traveling mode is selected at the immediately preceding timing and where the candidate brake force is less than the threshold THs', the control device 23 may determine that the traveling mode is to be switched to the engine traveling mode, and recalculate the required brake force and the required drive force. As a result, the required drive force may be set to be greater than the power-running-generative drive force Dth, causing the engine to restart. Thus, in a case where the power-running-generative drive force Dth is too small and where it is estimated that the feeling of strangeness of the user to be caused when a pressure boosting noise is generated due to the vehicle hold function is greater than the feeling of strangeness of the user to be caused when the engine is restarted, the required brake force may be set to the stop hold brake force Tp, as in the case where it is determined that the power-running-generative drive force Dth is less than the threshold THs in Step S109 of FIG. 7.

In contrast, if the candidate brake force is not less than the threshold THs' (Step S214: NO), the control device 23 may cause the procedure to proceed to Step S215. In Step S215, the control device 23 may change the required drive force to the power-running-generative drive force Dth, and cause the procedure to proceed to Step S218.

Accordingly, in a case where the EV traveling mode is selected at the immediately preceding timing, where the candidate brake force is less than the stop hold brake force Tp (i.e., where there is a need to restart the engine when the brake fluid pressure is boosted, setting the required brake force to the stop hold brake force Tp), and where that the candidate brake force is not less than the threshold THs' (i.e., the power-running-generative drive force Dth is not too small), the brake fluid pressure may be preliminarily boosted at the immediately preceding timing on the basis of the required brake force calculated setting the required drive force to the power-running-generative drive force Dth.

Further, in a case where that the candidate brake force is not less than the stop hold brake force Tp (i.e., where there is no need to restart the engine) (Step S213: NO), the control device 23 may cause the procedure to proceed to Step S216. In Step S216, the control device 23 may change the required brake force to the stop hold brake force Tp. Thereafter, in Step S217, the control device 23 may calculate a new required drive force by adding the difference between the candidate brake force and the required brake force (i.e., the candidate brake force—the required brake force) to the required drive force. The control device 23 may then cause the procedure to proceed to Step S218.

Accordingly, in a case where the EV traveling mode is selected at the immediately preceding timing and where the candidate brake force is not less than the stop hold brake force Tp (i.e., where there is no need to restart the engine when the brake fluid pressure is boosted, setting the required brake force to the stop hold brake force Tp), the brake fluid pressure may be preliminarily boosted at the immediately preceding timing on the basis of the required brake force set to the stop hold brake force Tp. Even if the candidate brake force is too large relative to the stop hold brake force Tp, the required brake force may be set to the stop hold brake force Tp. Therefore, it is possible to save the power of the vehicle while reducing the feeling of strangeness of the user caused by the vehicle hold function.

It should be appreciated that the foregoing example embodiments are not limitative and may be modified in various ways.

For example, although the vehicle stop control may be applied to the vehicle traveling under the ACC in the foregoing example embodiments, the vehicle stop control may be applied to a vehicle traveling using an automated driving technology or a one-pedal function. The one-pedal function may refer to a function that accelerate or decelerate the vehicle on the basis of operations on one pedal.

Further, in the foregoing example embodiments, the determination as to whether the power-running-generative drive force Dth is too small (Step S214 of FIG. 8) may be performed as the determination as to whether the candidate brake force is less than the threshold THs'. However, the determination as to whether the power-running-generative drive force Dth is too small may be performed as the determination as to whether the difference between the candidate brake force and the stop hold brake force Tp is greater than or equal to a predetermined value.

The vehicle control system (1) according to one example embodiment controls the vehicle including the engine and the motor (motor generator 10) as drive sources. The motor is driven by electric power supplied from a battery. The vehicle control system (1) includes the target drive force calculation unit (F1), the arithmetic unit (F2), the stop holding unit, the power-running-generative drive force (F3), and the traveling mode selection unit (F4). The target drive force calculation unit (F1) calculates the target drive force of the vehicle. The arithmetic unit (F2) calculates the required drive force and the required brake force on the basis of the target drive force. The required drive force is used to control driving of the engine and the motor, and the required brake force is used to control hydraulic brake. In a case where stop-timing brake force corresponding to the required brake force at a vehicle stop timing is not greater than or equal to stop hold brake force required to hold the vehicle in a stopped state, the stop holding unit holds the vehicle in the stopped state by boosting the brake fluid pressure to cause the stop-timing brake force to become greater than or equal to the stop hold brake force. The power-running-generative drive force calculation unit (F3) calculates the power-running-generative drive force that the motor is able to generate during power running on the basis of the output power capacity of the battery. In a case where the target drive force is greater than the power-running-generative drive force, the traveling mode selection unit (F4) selects the engine traveling mode in which the engine is driven. In a case where the target drive force is less than or equal to the power-running-generative drive force, the traveling mode selection unit (F4) selects the EV traveling mode in which the engine is stopped. In a case where the engine traveling mode is selected at an immediately preceding timing immediately before the vehicle stop timing, the arithmetic unit (F2) calculates the required drive force, setting the required brake force to the stop hold brake force or greater. In a case where the EV traveling mode is selected at the immediately preceding timing, the arithmetic unit (F2) calculates the required brake force, setting the required drive force to the power-running-generative drive force or less.

The brake force may be set to the stop hold brake force or greater at the vehicle stop timing by setting the required brake force to the stop hold brake force or greater at the immediately preceding timing. This prevents the brake fluid pressure from being boosted by the vehicle hold function and reduces the feeling of strangeness of the user. However, if the required brake force is set to the stop hold brake force or greater under conditions where the engine is stopped at the immediately preceding timing and where the power-running-generative drive force of the motor is small, the drive power required to offset the increment of the required brake force cannot be generated by driving only the motor, and thus the engine can be restarted. To address such a concern, in a case where the EV traveling mode is selected at the immediately preceding timing (i.e., in a case where the engine is stopped at the immediately preceding timing), the required brake force may be calculated, setting the required drive force to the power-running-generative drive force or less. Accordingly, in a case where the power-running-generative drive force is small and where there is a need to restart the engine to set the required brake force to the stop hold brake force or greater, the drive force required to offset the increment of the required brake force may be set to the power-running-generative drive force or less. This helps prevent the engine from restarting. That is, it is possible to reduce the feeling of strangeness of the user by preventing the engine from restarting immediately before the vehicle stop timing. Additionally, the brake fluid pressure is preliminarily boosted at the immediately preceding timing such that the required drive force does not exceed the power-running-generative drive force. This helps reduce the amount of the brake fluid pressure to be boosted with the vehicle hold function at the vehicle stop timing after the immediately preceding timing. Accordingly, it is possible to reduce the feeling of strangeness of the user caused when the brake fluid pressure is boosted by the vehicle hold function.

According to the example embodiment of the technology described above, it is possible to reduce the feeling of strangeness of the user caused when the engine is restarted to achieve the vehicle hold function and when the brake fluid pressure is boosted by the vehicle hold function. Accordingly, it is possible to reduce the feeling of strangeness of the user caused by the vehicle hold function.

Further, according to the vehicle control system of the example embodiment described above, in a case where the EV traveling mode is selected at the immediately preceding timing, the arithmetic unit calculates the required brake equal to either one of the stop hold brake force and the brake force required to satisfy the target drive force when the required drive force is set to the power-running-generative drive force, whichever is lower.

Accordingly, in a case where the power-running-generative drive force is large and where there is no need to restart the engine, the required brake force may be set to the stop hold brake force. This prevents the brake fluid pressure from being boosted by the vehicle hold function, and reduces the feeling of strangeness of the user. In contrast, in a case where the power-running-generative drive force is small and where there is a need to restart the engine when the brake fluid pressure is boosted by the vehicle hold function, the required brake force may be set such that the required drive force does not exceed the power-running-generative drive force. This prevents the engine from restarting and reducing the amount of the brake fluid pressure to be boosted by the vehicle hold function at the vehicle stop timing.

Accordingly, it is possible to reduce the feeling of strangeness of the user caused when the engine is restarted and when the brake fluid pressure is boosted by the vehicle hold function.

Further, according to the vehicle control system of the example embodiment described above, in a case where the EV traveling mode is selected at the immediately preceding timing, the arithmetic unit may determine whether the required brake force calculated is less than the predetermined threshold (THs') (refer to Step S214). If the required brake force is less than the predetermined threshold, the traveling mode may be switched to the engine traveling mode, and the required brake force and the required drive force may be recalculated (refer to Steps S204 and S205).

As described above, in a case where the EV traveling mode is selected at the immediately preceding timing, it may be determined whether the required brake force calculated is less than the predetermined threshold. Through the determination, it may be determined whether the power-running-generative drive force is too small, that is, whether the amount of the brake fluid pressure to be boosted at the vehicle stop timing would be too large if the brake fluid pressure is boosted at the immediately preceding timing on the basis of the required brake force calculated such that the required brake force does not exceed the power-running-generative drive force. Further, after the traveling mode is switched to the engine traveling mode and the required brake force and the required drive force are recalculated, the required drive force may be set to be greater than the power-running-generative drive force, causing the engine to restart. According to the configuration described above, in a case where the EV traveling mode is selected and the engine is stopped at the immediately preceding timing, where the power-running-generative drive force is too small, and where the amount of the brake fluid pressure to be boosted at the vehicle stop timing would be too large if the brake fluid pressure is boosted at the vehicle stop timing on the basis of the required brake force calculated such that the required drive force does not exceed the power-running-generative drive force, it is possible to restart the engine to boost the brake fluid pressure to the brake fluid pressure required to hold the vehicle in the stopped state or greater.

If the brake fluid pressure is boosted at the immediately preceding timing on the basis of the required brake force calculated such that the required drive force does not exceed the power-running-generative drive force under the condition where the power-running-generative drive force is too small, the amount of the brake fluid pressure preliminarily boosted at the immediately preceding timing can become too small. As a result, the amount of the brake fluid pressure boosted at the vehicle stop timing can become too large. The feeling of strangeness of the user to be caused when the too large amount of brake fluid pressure is boosted can be greater than the feeling of strangeness of the user to be caused when the engine is restarted. According to the above-described configuration addressing such a concern, the engine is allowed to restart to preliminarily boost the brake fluid pressure to the pressure required to achieve the vehicle hold function. That is, if it is estimated that the feeling of strangeness of the user to be caused when the brake fluid pressure is boosted is greater than the feeling of strangeness of the user to be caused when the engine is restarted, the engine is restarted to preferentially reduce the feeling of strangeness to be caused by the pressure boosting noise. Even in such a case, it is possible to boost the brake fluid pressure to the level required to hold the vehicle in the stopped state. Accordingly, it is possible to reduce the feeling of strangeness of the user caused by the vehicle hold function in view of the balance between the feeling of strangeness to be caused by the pressure boosting noise and the feeling of strangeness to be caused by restarting the engine.

Further, according to the foregoing example embodiments of the technology, in a case where the EV traveling mode is selected at the immediately preceding timing, the arithmetic unit in the vehicle control system may determine whether the difference between the calculated required brake force and the stop hold brake force is greater than or equal to the predetermined value. If the difference is less than the predetermined threshold, the arithmetic unit may determine to switch the traveling mode to the engine traveling mode, and recalculate the required brake force and the required drive force.

As described above, in a case where the EV traveling mode is selected at the immediately preceding timing, it may be determined whether the difference between the calculated required brake force and the stop hold brake force is greater than or equal to the predetermined threshold. Through the determination, it may be determined whether the power-running-generative drive force is too small, that is, whether the amount of the brake fluid pressure to be boosted at the vehicle stop timing is too large if the brake fluid pressure is boosted at the immediately preceding timing on the basis of the required brake force calculated such that the required drive force does not exceed the power-running-generative drive force.

According to the configuration described above, if it is estimated that the feeling of strangeness of the user to be caused when the pressure boosting noise is generated is greater than the feeling of strangeness of the user to be caused when the engine is restarted, the engine is allowed to restart to preferentially reduce the feeling of strangeness to be caused by the pressure boosting noise. Even in such a case, it is possible to boost the brake fluid pressure to the level required to hold the vehicle in the stopped state. Accordingly, it is possible to reduce the feeling of the strangeness of the user caused by the vehicle hold function in view of the balance between the feeling of strangeness to be caused by the pressure boosting noise and the feeling of strangeness to be caused by restarting the engine.

Further, the vehicle control system according to the foregoing example embodiments of the technology may calculate the output power capacity of the battery on the basis of the state of charge, the voltage, and the temperature of the battery. The power-running-generative drive force calculation unit may calculate the power-running-generative drive force on the basis of the output power capacity of the battery and the temperature of the motor.

Accordingly, it is possible to calculate a proper power-running-generative drive force.

According to at least one example embodiment of the technology, it is possible to reduce the feeling of strangeness of the user caused by the vehicle hold function.

One or more of the target drive force calculation unit F1, the arithmetic unit F2, the stop holding unit, the power-running-generative drive force F3, and the traveling mode selection unit F4 in the control device 23 illustrated in FIG. 3 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the target drive force calculation unit F1, the arithmetic unit F2, the stop holding unit, the power-running-generative drive force F3, and the traveling mode selection unit F4. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the target drive force calculation unit F1, the arithmetic unit F2, the stop holding unit, the power-running-generative drive force F3, and the traveling mode selection unit F4 in the control device 23 illustrated in FIG. 3.

The invention claimed is:

1. A vehicle control system configured to control a vehicle including an engine and a motor as drive sources, the motor being configured to be driven by electric power supplied from a battery, the vehicle control system comprising at least one machine readable medium storing instructions and at least one processor configured to execute the instructions to:
calculate target drive force of the vehicle;
calculate required drive force and required brake force on a basis of the target drive force, the required drive force being used to control driving of the engine and the motor, the required brake force being used to control hydraulic brake;

in a case where stop-timing brake force corresponding to the required brake force at a vehicle stop timing is not greater than or equal to stop hold brake force required to hold the vehicle in a stopped state, hold the vehicle in the stopped state by boosting a brake fluid pressure to cause brake force to be the stop hold brake force or greater;

calculate, on a basis of an output power capacity of the battery, power-running-generative drive force that the motor is able to generate during power running;

select, in a case where the target drive force is greater than the power-running-generative drive force, an engine traveling mode in which the engine is driven;

select, in a case where the target drive force is less than or equal to the power-running-generative drive force, an electric vehicle traveling mode in which the engine is stopped;

calculate the required drive force by setting the required brake force to the stop hold brake force or greater in a case where the engine traveling mode is selected at an immediately preceding timing immediately before the vehicle stop timing; and calculate the required brake force by setting the required drive force to the power-running-generative drive force or less in a case where the electric vehicle traveling mode is selected at the immediately preceding timing.

2. The vehicle control system according to claim 1, wherein,
in a case where the electric vehicle traveling mode is selected at the immediately preceding timing, the at least one processor is configured to execute the instructions to calculate the required brake force equal to either one of the stop hold brake force and the brake force required to satisfy the target drive force when the required drive force is set to the power-running-generative drive force, whichever is lower.

3. The vehicle control system according to claim 1, wherein the at least one processor is configured to execute the instructions to
determine whether the required brake force calculated is less than a predetermined threshold in a case where the electric vehicle traveling mode is selected at the immediately preceding timing, and
determine to switch to the engine traveling mode and recalculate the required brake force and the required drive force in a case where the required brake force is less than the predetermined threshold.

4. The vehicle control system according to claim 2, wherein the at least one processor is configured to execute the instructions to
determine whether the required brake force calculated is less than a predetermined threshold in a case where the electric vehicle traveling mode is selected at the immediately preceding timing, and
determine to switch to the engine traveling mode and recalculate the required brake force and the required drive force in a case where the required brake force is less than the predetermined threshold.

5. The vehicle control system according to claim 1, wherein the at least one processor is configured to execute the instructions to
determine whether a difference between the required brake force calculated and the stop hold brake force is greater than or equal to a predetermined value in a case where the electric vehicle traveling mode is selected at the immediately preceding timing, and
determine to switch to the engine traveling mode and recalculate the required brake force and the required drive force in a case where the difference is less than the predetermined value.

6. The vehicle control system according to claim 2, wherein the at least one processor is configured to execute the instructions to
determine whether a difference between the required brake force calculated and the stop hold brake force is greater than or equal to a predetermined value in a case where the electric vehicle traveling mode is selected at the immediately preceding timing, and
determine to switch to the engine traveling mode and recalculate the required brake force and the required drive force in a case where the difference is less than the predetermined value.

7. The vehicle control system according to claim 1, wherein
the output power capacity of the battery is calculated on a basis of a state of charge, voltage, and temperature of the battery, and
the at least one processor is configured to execute the instructions to calculate the power-running-generative drive force on a basis of the output power capacity of the battery and temperature of the motor.

8. The vehicle control system according to claim 2, wherein
the output power capacity of the battery is calculated on a basis of a state of charge, voltage, and temperature of the battery, and
the at least one processor is configured to execute the instructions to calculate the power-running-generative drive force on a basis of the output power capacity of the battery and temperature of the motor.

9. The vehicle control system according to claim 3, wherein
the output power capacity of the battery is calculated on a basis of a state of charge, voltage, and temperature of the battery, and
the at least one processor is configured to execute the instructions to calculate the power-running-generative drive force on a basis of the output power capacity of the battery and temperature of the motor.

10. The vehicle control system according to claim 4, wherein
the output power capacity of the battery is calculated on a basis of a state of charge, voltage, and temperature of the battery, and
the at least one processor is configured to execute the instructions to calculate the power-running-generative drive force on a basis of the output power capacity of the battery and temperature of the motor.

11. The vehicle control system according to claim 5, wherein
the output power capacity of the battery is calculated on a basis of a state of charge, voltage, and temperature of the battery, and
the at least one processor is configured to execute the instructions to calculate the power-running-generative drive force on a basis of the output power capacity of the battery and temperature of the motor.

12. The vehicle control system according to claim 6, wherein the output power capacity of the battery is calculated on a basis of a state of charge, voltage, and temperature of the battery, and the at least one processor is configured to execute the instructions to calculate the power-running-generative drive force on a basis of the output power capacity of the battery and temperature of the motor.

13. A vehicle control system configured to control a vehicle including an engine and a motor as drive sources, the motor being configured to be driven by electric power supplied from a battery, the vehicle control system comprising circuitry configured to calculate target drive force of the vehicle, calculate required drive force and required brake force on a basis of the target drive force, the required drive force being used to control driving of the engine and the motor, the required brake force being used to control hydraulic brake, hold, in a case where stop-timing brake force corresponding to the required brake force at a vehicle stop timing is not greater than or equal to stop hold brake force required to hold the vehicle in a stopped state, the vehicle in the stopped state by boosting a brake fluid pressure to cause brake force to be the stop hold brake force or greater, calculate, on a basis of an output power capacity of the battery, power-running-generative drive force that the motor is able to generate during power running, select, in a case where the target drive force is greater than the power-running-generative drive force, an engine traveling mode in which the engine is driven, select, in a case where the target drive force is less than or equal to the power-running-generative drive force, an electric vehicle traveling mode in which the engine is stopped, calculate the required drive force by setting the required brake force to the stop hold brake force or greater in a case where the engine traveling mode is selected at an immediately preceding timing immediately before the vehicle stop timing, and calculate the required brake force by setting the required drive force to the power-running-generative drive force or less in a case where the electric vehicle traveling mode is selected at the immediately preceding timing.

14. A vehicle control system configured to control a vehicle including an engine and a motor as drive sources, the motor being configured to be driven by electric power supplied from a battery, the vehicle control system comprising circuitry configured to:

when i) an accelerator pedal of the vehicle is not operated, ii) a vehicle speed of the vehicle is less than or equal to a predetermined threshold and iii) the engine is stopped, acquire a required brake force indicating a hydraulic brake force generated by a hydraulic brake mechanism of the vehicle;

determine whether the required brake force is greater than or equal to a predetermined brake force;

in response to a determination that the required brake force is not greater than or equal to the predetermined brake force, i) calculate a maximum value of a drive force generated by the motor based on an output power capacity of the battery, ii) calculate a differential value by subtracting the required brake force from the predetermined brake force, and iii) calculate a increment that is a drive force generated by the drive source to offset a brake force equal to the differential value;

determine whether the maximum value of the drive force generated by the motor is less than the increment;

in response to a determination that the maximum value of the drive force generated by the motor is not less than the increment, i) control the motor so that the motor generates a drive force equal to the increment, and ii) control the hydraulic brake mechanism so that the hydraulic brake mechanism generates the predetermined brake force;

in response to a determination that the maximum value of the drive force generated by the motor is less than the increment, i) control the motor so that the motor generates a drive force equal to the maximum value of the drive force generated by the motor, and ii) control the hydraulic brake mechanism so that the hydraulic brake mechanism generates a brake force equal to a sum of the required brake force and a brake force to offset the drive force equal to the maximum value of the drive force generated by the motor.

15. The vehicle control system according to claim 14, wherein the circuitry is configured to calculate the output power capacity of the battery based on a state of charge, voltage, and temperature of the battery, and wherein the circuitry is configured to calculate the maximum value of the drive force generated by the motor based on the output power capacity of the battery and temperature of the motor.

* * * * *